Figure 1:
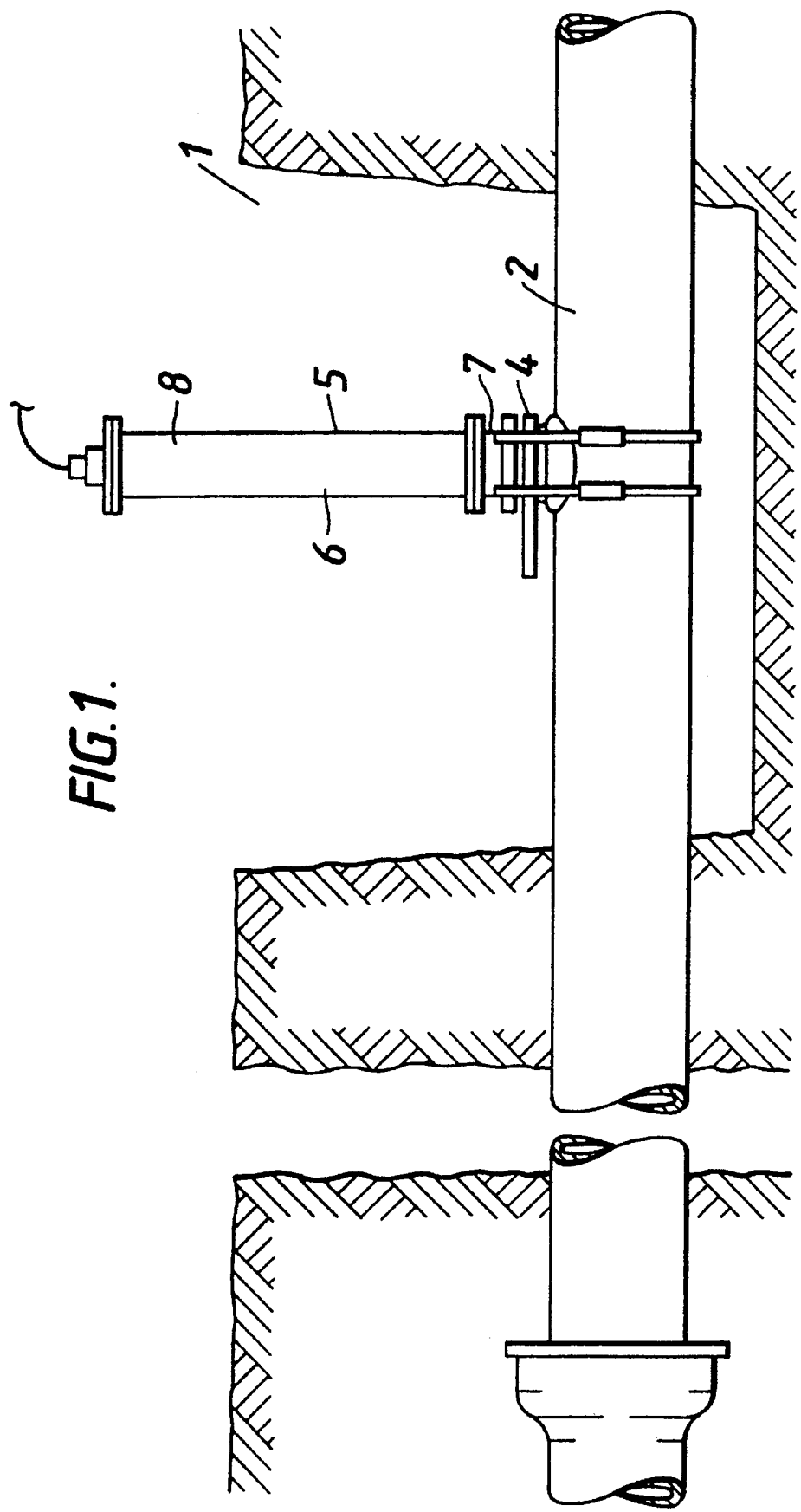

United States Patent [19]
Cotton et al.

[11] Patent Number: 5,611,283
[45] Date of Patent: Mar. 18, 1997

[54] INSERTION AND GUIDANCE OF A PIPE TRAVELLING VEHICLE IN THE PIPE

[75] Inventors: Michael Cotton, West Yorkshire; Kevin M. Horan, Leeds, both of Great Britain

[73] Assignee: British Gas plc, London, Great Britain

[21] Appl. No.: 523,249

[22] Filed: Sep. 5, 1995

[30] Foreign Application Priority Data

Sep. 9, 1994 [GB] United Kingdom ............... 94-18161
Apr. 11, 1995 [GB] United Kingdom ............... 95-07547

[51] Int. Cl.$^6$ .................................................. B61B 13/10
[52] U.S. Cl. .......................................................... 104/138.2
[58] Field of Search ............................. 104/138.2, 138.1

[56] References Cited

U.S. PATENT DOCUMENTS

| | | | |
|---|---|---|---|
| 4,006,359 | 2/1977 | Sullins et al. ............... | 104/138.2 X |
| 4,244,296 | 1/1981 | Vertut ............................. | 104/138.2 |
| 4,862,808 | 9/1989 | Hedgcoxe et al. ............. | 104/138.2 |
| 5,142,990 | 9/1992 | Leonard ......................... | 104/138.2 |

Primary Examiner—S. Joseph Morano
Attorney, Agent, or Firm—William R. Hinds

[57] ABSTRACT

A method for guiding a motor driven wheeled device in a required direction along the interior of a pipe comprises providing the device with a guard, lowering the device with the guard leading through a hole bored in the wall of the pipe to gain access to the interior of the pipe, causing the guard to engage the internal wall of the pipe and position the device on its wheels facing in the required direction and then starting the motor to cause the wheels to rotate and move the device in the required direction.

8 Claims, 5 Drawing Sheets

INSERTION AND GUIDANCE OF A PIPE TRAVELLING VEHICLE IN THE PIPE

The present invention relates to guiding a device in a required direction along the interior of a pipe.

It is known to guide devices along the interior of pipe for such purposes as inspecting the interior wall of the pipe (in which case the device is a closed circuit television camera) or spraying the wall with a sealant (in which case the device is a spray head).

The devices are usually introduced into the pipe via a hole bored in the wall of the pipe. It is, of course, important to ensure that upon introduction into the pipe the device is guided in the correct direction and this can be very much a hit or miss affair.

In known techniques of seeking to ensure that the device travels in the correct direction, entry pipes or tubes are provided arranged at an angle to the vertical to carry the device into the pipe via the bored hole to ensure the device travels in the selected direction. However, the disadvantage of these techniques is that the entry tubes reduce the overall size of the device which can be introduced into the pipe as the device is introduced at an angle to the hole in the pipe wall.

It is therefore an object of the present invention to overcome this disadvantage.

According to one aspect of the present invention, there is provided a method for guiding a motor driven wheeled device in a required direction along the interior of a pipe comprising providing the device with a guard, suspending the device by a flexible cable such that the guard is lowermost, the shape of the guard and the weight distribution of the device being such that when the guard of the suspended device is lowered into contact with an obstacle, the device will tilt so as to be positioned on its wheels facing in the required direction, lowering the device with the guard leading through a hole bored in the wall of the pipe to gain access to the interior of the pipe and to cause the guard to engage the internal wall of the pipe and thus tilt and position the device on its wheels facing in the required direction, and then starting the motor to cause the wheels to rotate and move the device in the required direction.

According to another aspect of the present invention, there is provided a device for movements in a required direction along the interior of a pipe, comprising a body having wheels which are drivable by a motor and a guard which is secured to the body, the arrangement being such that, in use, the body and the guard are suspended and lowered by a flexible cable through a hole bored in the wall of the pipe, with the guard in the lowermost position, the shape of the guard and the weight distribution of the body are such that when the guard comes into contact with the internal wall of the pipe as a result of the body and the guard being lowered through a hole bored in the wall of the pipe the device tilts so as to be positioned on its wheels facing in the required direction.

Because the device can be introduced substantially vertically to the axis of the pipe, the full bore of the hole in the pipe wall can be used.

An embodiment of the invention will now be particularly described with reference to the accompanying drawings in which:

FIG. 1 shows an insertion tube in position on a pipe such as a main carrying gas under pressure before the introduction of a device such as an inspection camera, FIGS. 2 to 5 comprise longitudinal sections through the insertion tube and the main showing a sequence of operations for guiding the camera along the main.

Referring to the drawings, in the situation shown in FIG. 1, an excavation 1 has been dug so as to reveal a portion of a live gas main 2.

Figure 2:
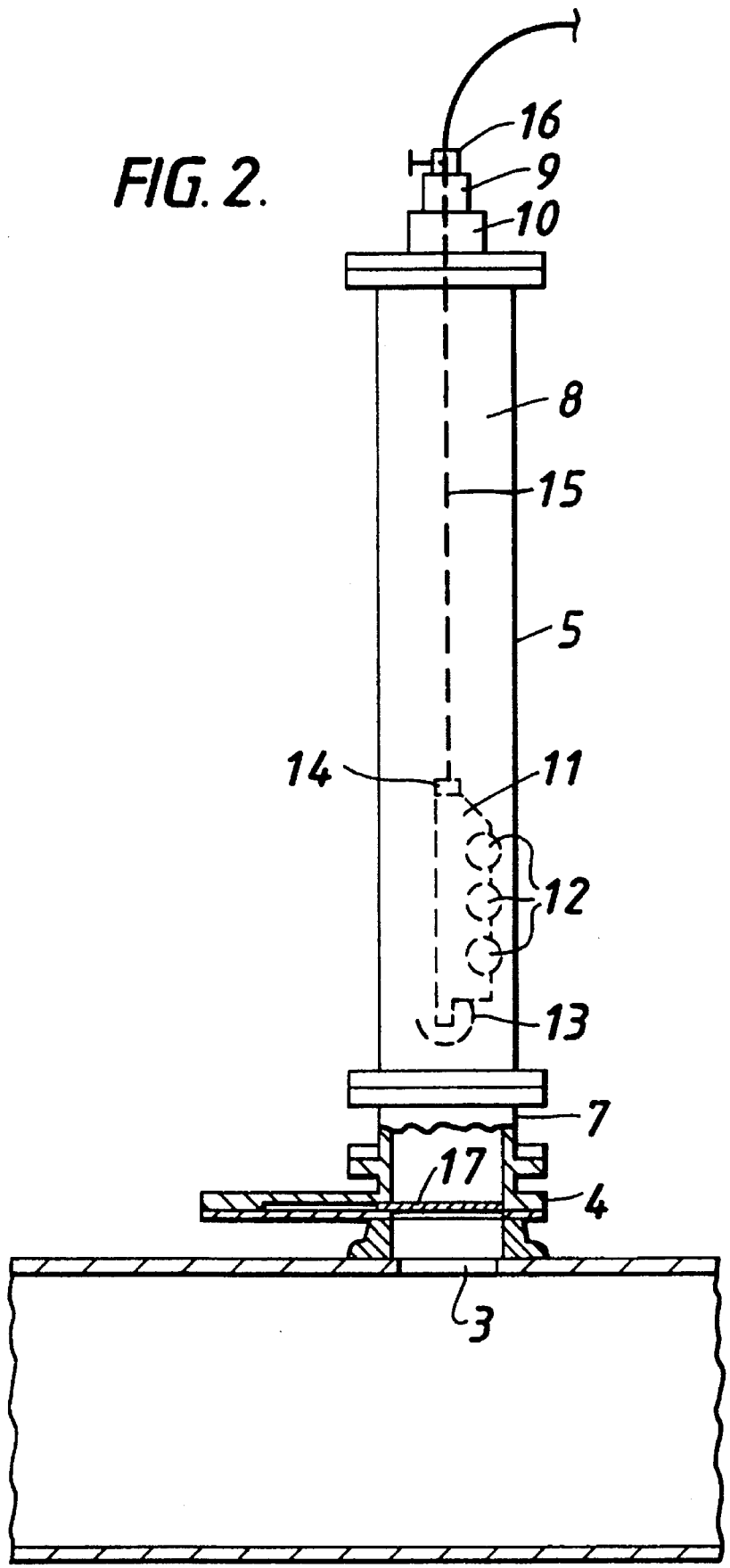
Figure 3:
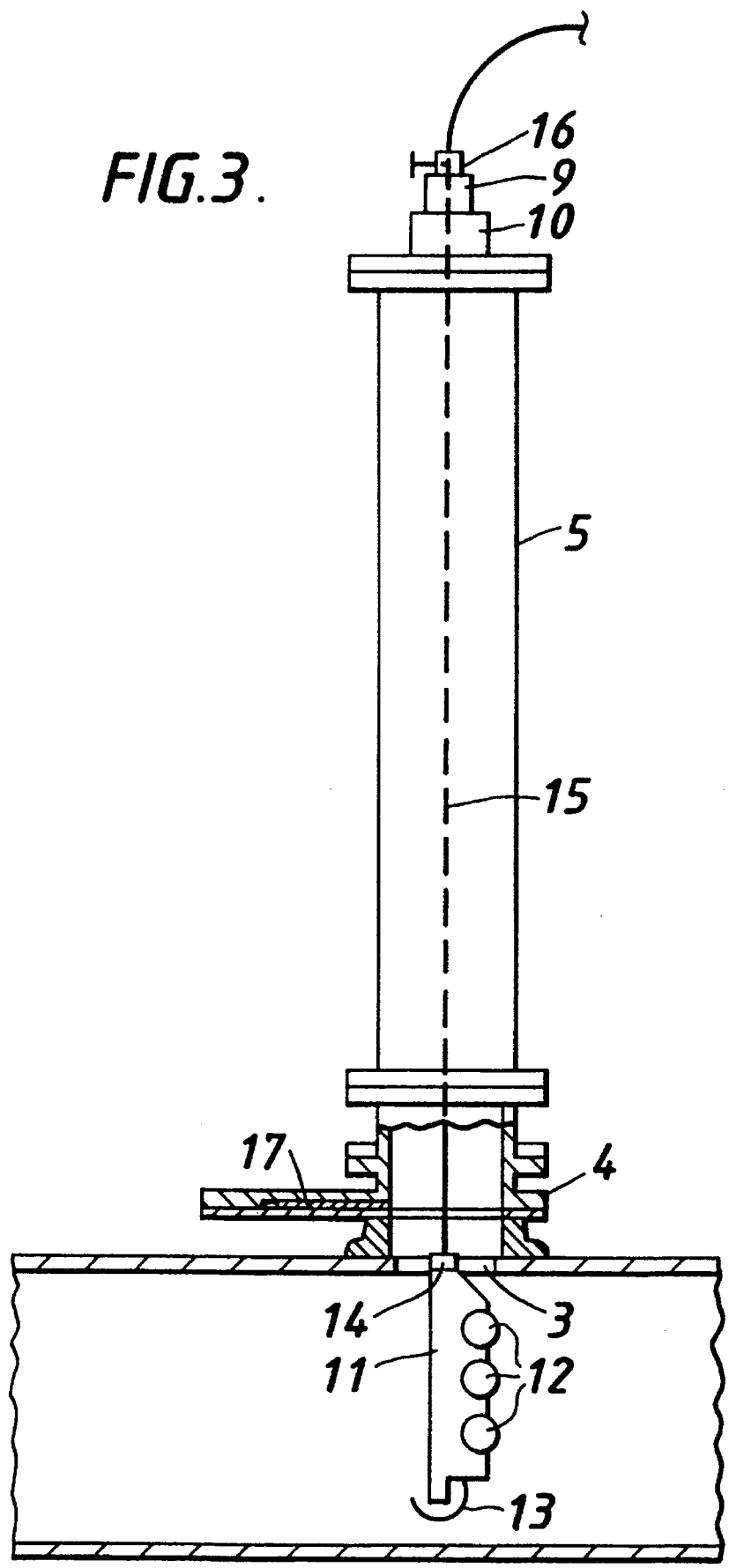
Figure 4:
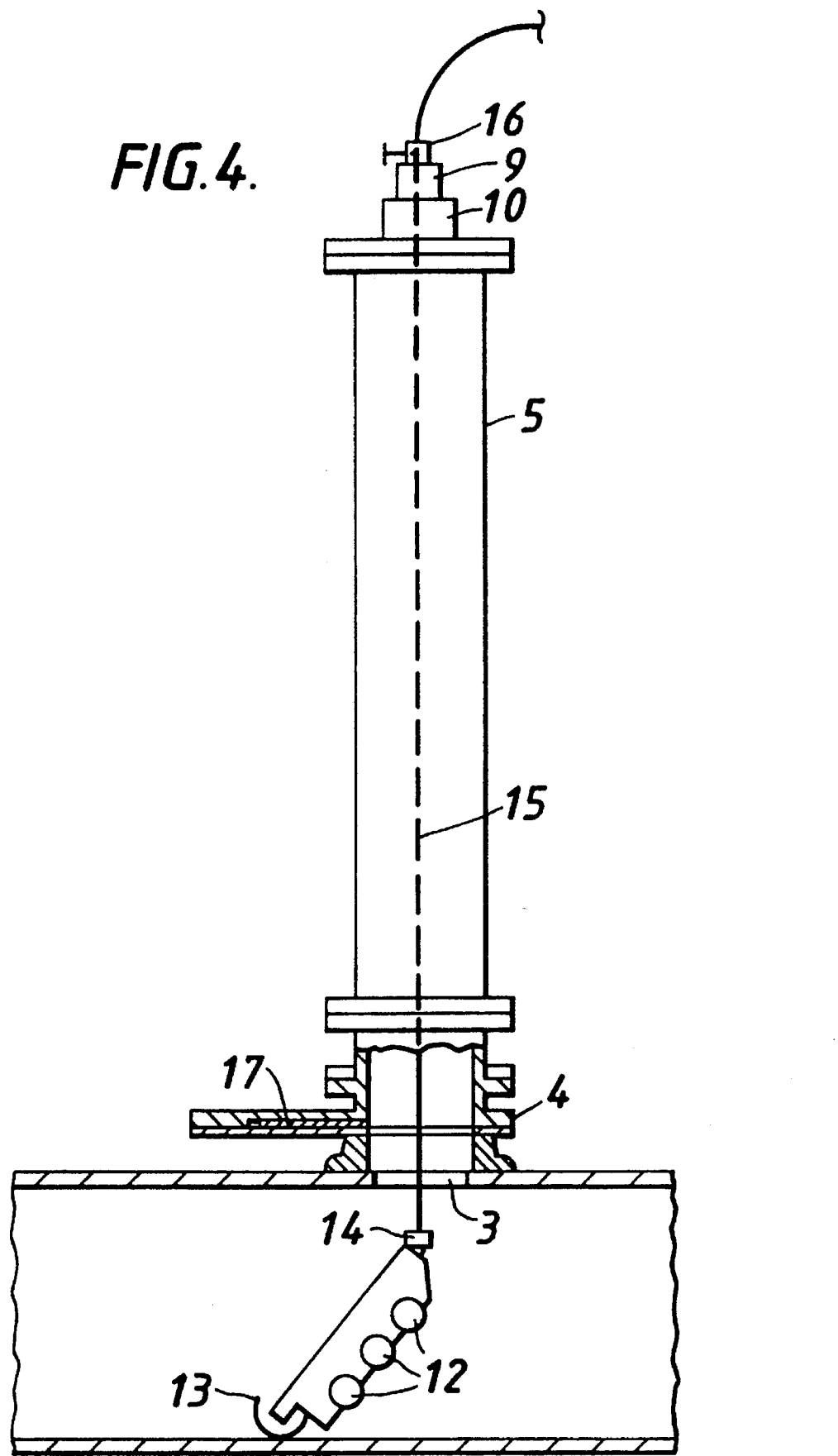
Figure 5:
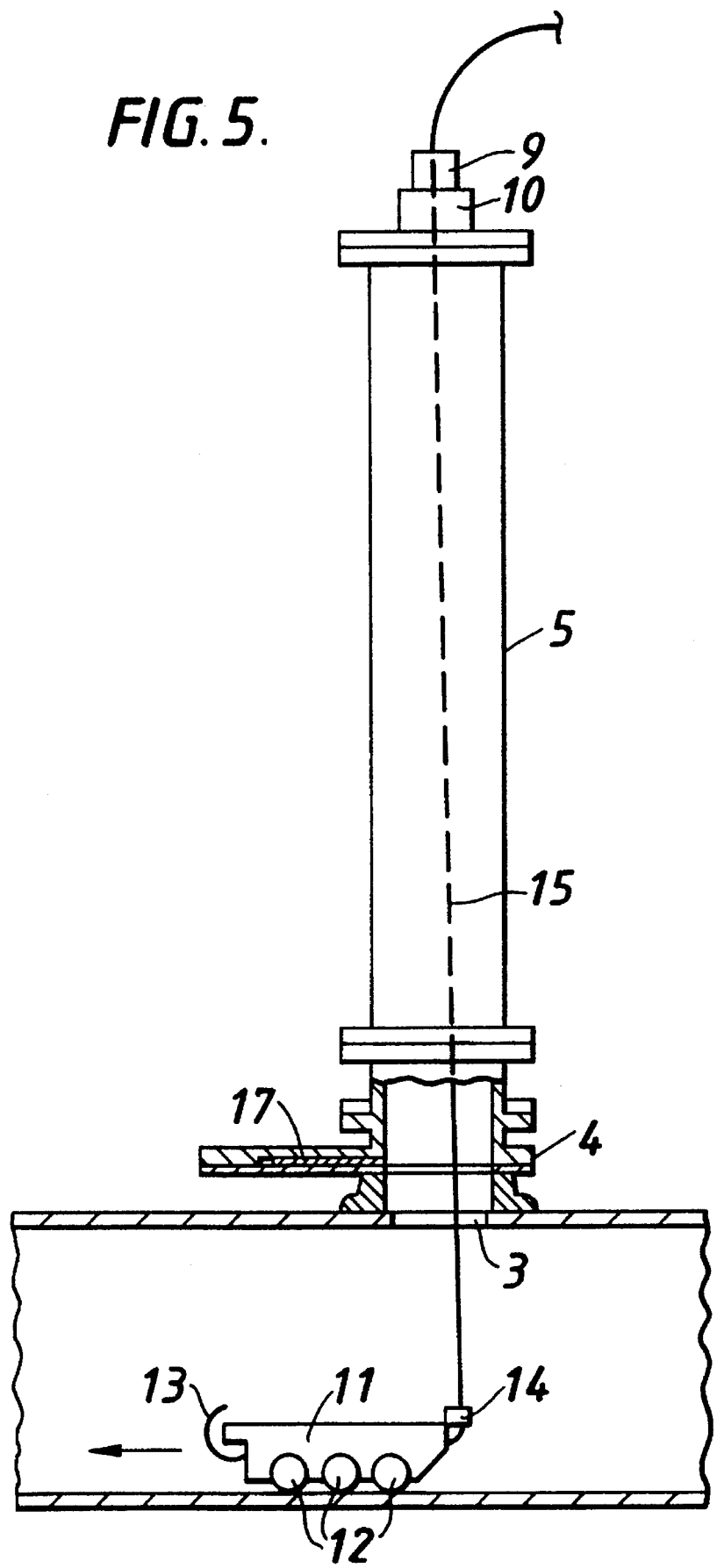

In FIGS. 2 to 4 a hole 3 has been drilled in the wall of the main 2.

In the known technique used here to drill the hole an Iris plate valve 4 manufactured by ALH Systems Ltd was mounted on the main 2. An underpressure drill (not shown) was fitted to the plate valve 4 and operated to cut the hole 3 through the main (FIGS. 1 and 2).

A conventional construction and design insertion tube 5 is then fitted to the plate valve 4 in place of the underpressure drill in the well known manner.

The insertion tube 5 has a main tubular outer body 6 having a lowermost portion 7 for bolting to the plate valve 4 and an uppermost portion 8 detachably removable by a screw-thread from the portion 7.

The insertion tube 5 also has a rubber gland 9 mounted in a socket 10 at its uppermost end for purposes to be described.

In the case of this invention the device to be inserted into the main 2 is a conventional closed circuit pipe wall inspection television camera 11 of the tractorised type having motor driven wheels 12 as seen in FIGS. 2 to 4. The camera 11 is provided at its front end with a part-circular guard 13 which serves as a guide for the camera 11 in use.

The camera 11 is releasably attached at one end via a knuckle joint coupling 14 to a flexible camera cable 15. The other end of the cable 15 (not shown) is, in use, attached to a data interface port, television monitor, video recorder and printer.

Referring to FIGS. 2 to 5, the sequence of operations for guiding the camera 11 along the main 1 is as follows. With the portion 7 of the insertion tube 5 temporarily removed from the plate valve 4 and clear thereof (not shown), the end of the cable 15 is pushed through the rubber gland 9 which has a central aperture for the purpose and is clamped by a clamp 16 which holds the camera cable, in position temporarily.

The cable 15 is then connected to the camera 11 and the clamp 16 is released and removed. The aperture in the gland 9 is so dimensioned that the gland 9 forms a seal round the cable 15. It will be appreciated that at this stage the closure plate 17 in the plate valve 4 is closed to prevent the escape of gas from the main. The uppermost portion 8 of the insertion tube 5 is then reconnected to the lowermost portion 7.

In the next stage of the process (FIG. 2) the plate 17 in the plate 4 valve is opened and the camera 11 is positioned by rotating the cable 15 if necessary while the camera 11 hangs therefrom so that the camera 11 faces in the correct direction. The camera 11 is then lowered into the interior of the main 2 until the camera guard 13 comes into contact with the bottom wall of the main 2 as shown in FIG. 3. At this point the circular shape of the guard 13 and the weight distribution of the camera 11 cause it to tilt over onto its wheels 12 at which point the motor in the camera 11 is started and this has the effect of "kicking" the tractor camera in the desired direction along the main 2 (as shown in FIG. 4).

The camera cable 15 is fed continuously through the gland 9 so that the camera 11 is caused to move along the main 2 as far as possible relaying pictures back to the monitor.

To remove the camera 11 from the main 2, the motor which powers the tractor camera 11 is reversed while the cable 15 is pulled back through the gland 9 until the camera 11 has been withdrawn through the open plate valve 4 which is then closed.

The insertion tube 5 is then removed from the plate valve 4. Using any well known technique the hole 3 in the wall of the main 2 can be plugged, e.g. by means of a non-tap plug before the plate valve 4 is removed.

We claim:

1. A device for movements in a required direction along the interior of a pipe, comprising a body having wheels which are drivable by a motor and a guard which is secured to the body, the arrangement being such that, in use, the body and the guard are suspended and lowered by a flexible cable through a hole bored in the wall of the pipe, with the guard in the lowermost position, the shape of the guard and the weight distribution of the body are such that when the guard comes into contact with the internal wall of the pipe as a result of the body and the guard being lowered through a hole bored in the wall of the pipe the device tilts so as to be positioned on its wheels facing in the required direction.

2. A device as claimed in claim 1 which the body comprises a camera.

3. A device as claimed in claim 1 in which the guard is circular in shape at least in its wall contacting portion.

4. A device as claimed in claim 2 in which the guard is circular in shape at least in its wall contacting portion.

5. A device as claimed in claim 1 wherein said body includes means for releasably coupling the flexible cable thereto so as to suspend the body and guard with the guard lowermost.

6. A device as claimed in claim 1 in combination with the flexible cable releasably coupled to said body for suspending the body with the guard lowermost.

7. A method for guiding a motor driven wheeled device in a required direction along the interior of a pipe comprising providing the device with a guard, suspending the device by a flexible cable such that the guard is lowermost, the shape of the guard and the weight distribution of the device being such that when the guard of the suspended device is lowered into contact with an obstacle the device will tilt so as to be positioned on its wheels facing in the required direction, lowering the device with the guard leading through a hole bored in the wall of the pipe to gain access to the interior of the pipe and to cause the guard to engage the internal wall of the pipe and thus tilt and position the device on its wheels facing in the required direction, and then starting the motor to cause the wheels to rotate and move the device in the required direction.

8. A method as claimed in claim 7 comprising providing a vertically disposed insertion tube mounted so as to lead to said hole in the pipe such that said suspended device is lowered through said tube with adequate clearance such that the cable and the suspended device can be rotated in said tube to position the suspended device to face in the required direction when tilted and positioned on its wheels.

* * * * *